United States Patent
Barth et al.

(10) Patent No.: US 8,255,329 B1
(45) Date of Patent: Aug. 28, 2012

(54) METHODS AND SYSTEMS FOR INVESTMENT OF DEBIT CARD WITHDRAWAL FEES

(75) Inventors: Ryan Ray Barth, San Antonio, TX (US); Ryan Todd Everett, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 17 days.

(21) Appl. No.: 11/539,929

(22) Filed: Oct. 10, 2006

Related U.S. Application Data

(60) Provisional application No. 60/830,942, filed on Jul. 13, 2006.

(51) Int. Cl.
*G06Q 40/00* (2012.01)
(52) U.S. Cl. .............................................. 705/43; 705/35
(58) Field of Classification Search .................... 705/38, 705/35, 43
See application file for complete search history.

(56) References Cited

U.S. PATENT DOCUMENTS

| | | | |
|---|---|---|---|
| 5,909,794 A | 6/1999 | Molbak | |
| 6,112,191 A | 8/2000 | Burke | |
| 6,308,887 B1 | 10/2001 | Korman | |
| 2003/0093293 A1 * | 5/2003 | Han | 705/1 |
| 2003/0144942 A1 * | 7/2003 | Sobek | 705/36 |
| 2003/0149629 A1 * | 8/2003 | Claridge et al. | 705/17 |
| 2003/0177084 A1 * | 9/2003 | Cassani et al. | 705/36 |
| 2003/0200163 A1 | 10/2003 | O'Riordan | |
| 2004/0124966 A1 | 7/2004 | Forrest | |
| 2005/0021363 A1 | 1/2005 | Stimson | |
| 2006/0200411 A1 * | 9/2006 | Morgenstern et al. | 705/43 |
| 2006/0242041 A1 * | 10/2006 | Canney | 705/35 |
| 2007/0027806 A1 * | 2/2007 | Sands et al. | 705/42 |
| 2007/0078766 A1 | 4/2007 | Thomas | |
| 2007/0106581 A1 * | 5/2007 | Mitchell et al. | 705/35 |

OTHER PUBLICATIONS

Dave Segal. (Mar. 4, 2006). New bank to give 10% of profits to charity. Honolulu Star—Bulletin. Retrieved Apr. 22, 2012.*
"Bank Accounts that refund all ATM fees", http://soundmoneytips.com/article/2646, Dec. 8, 2004, pp. 1-3.
"Shop around to avoid rising ATM fees", http://www.usaweekend.com/05_issues/051204/051204thinksmart.html, Dec. 4, 2005, pp. 1-4.
Olson, Thomas, "Banks eyeball PNC fee refund", Pittsburgh Tribune-Review, http://www.pittsburghlive.com/x/pittsburghtrib/news/mostread/print_467487.html, Aug. 24, 2006, pp. 1-3.

* cited by examiner

*Primary Examiner* — Kito R Robinson
(74) *Attorney, Agent, or Firm* — Brooks, Cameron & Huebsch, PLLC

(57) ABSTRACT

A debit-card withdrawal-fee payment method includes receiving selection of a first account to which withdrawal-fee payments are to be directed, receiving notification of a debit-card transaction withdrawal-fee amount associated with a second account, and making a withdrawal-fee payment to the first account in the withdrawal-fee amount.

18 Claims, 1 Drawing Sheet

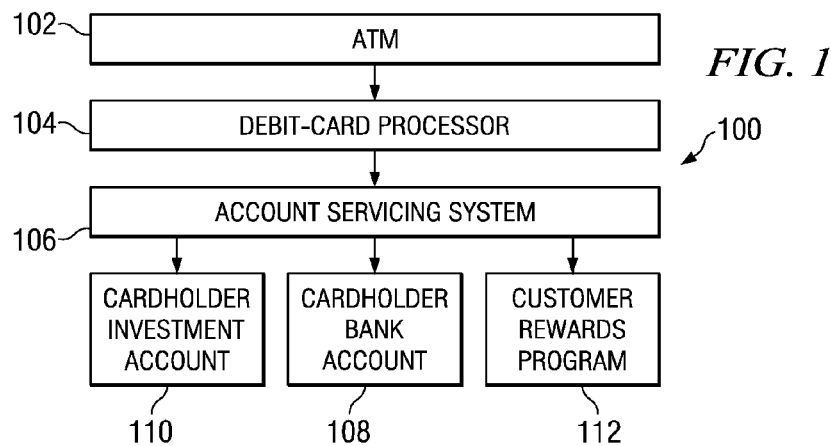
*FIG. 1*
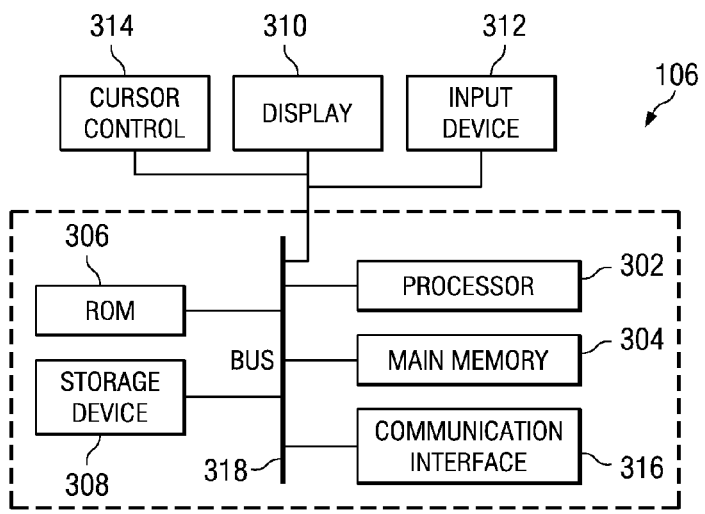

METHODS AND SYSTEMS FOR INVESTMENT OF DEBIT CARD WITHDRAWAL FEES

CROSS-REFERENCE TO RELATED APPLICATIONS

This application is related to subject matter to, and incorporates by reference herein in its entirety, each of the following:

a U.S. patent application entitled METHODS AND SYSTEMS OF PROVIDING INVESTMENT REWARDS BASED ON PURCHASES, bearing Ser. No. 11/548,015 and filed on the same date as this patent application; and a U.S. patent application entitled METHODS AND SYSTEMS FOR CUSTOMER-DIRECTED ROUNDED-PURCHASE-AMOUNT INVESTMENTS, bearing Ser. No. 11/548,169 and filed on the same date as this patent application.

This patent application claims priority from U.S. Provisional Patent Application No. 60/830,942, entitled Method and Systems for Implementing an ATM and Debit Card Rebate Sweep and filed on Jul. 13, 2006.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

Disclosed embodiments relate generally, by way of example and not limitation, to systems and methods that permit a financial-institution customer holding a debit card (i.e., cardholder) to direct refunds of debit-card withdrawal fees paid by the customer, for example, at automatic teller machines (ATMs), to various accounts, including, but not limited to, the cardholder's savings accounts or investment accounts.

2. History of Related Art

In recent years, usage of debit cards has increased greatly. One of the primary ways in which debit cards are used by financial-institution customers (i.e., cardholders) is at ATMs. Most ATMs permit cardholders to withdraw funds from their accounts, check their account balances, deposit funds into their accounts, and transfer funds between their accounts.

One disadvantage of ATMs from the cardholder's perspective is the withdrawal fees that are oftentimes charged at ATMs. Some ATMs charge some substantial withdrawal fees to cardholders who are not associated with the bank or other financial institution providing the ATM the cardholder seeks to use. These fees are typically at least $1.00 and, in some cases, can be as great as $3.00 per transaction or more.

As would be expected, many cardholders are not particularly pleased with the practice of ATMs of charging withdrawal fees, the cardholders' reasoning being that the money in their accounts is already theirs and that it is not fair for the cardholder to be charged to withdraw their own money, especially given the fact that the costs associated with an ATM are less than the costs associated with having a human bank teller available to service the cardholders' cash withdrawals from their accounts. Of course, from the perspective of many financial institutions, charging withdrawal fees is reasonable, especially when the cardholder is not a customer of the financial institution that provides the ATM.

In light of the above, some financial institutions have begun to refund ATM withdrawal fees to their customers. In some cases, the refund of the ATM withdrawal fees is made regardless of the financial institution providing the ATM used by the cardholder. In some cases, the customer is required to collect ATM receipts and provide them to their financial institution in order to obtain refund of the corresponding withdrawal fees. In other cases, the refund occurs automatically without any cardholder involvement being necessary. The refund can appear as a credit to the cardholder's checking account in order to offset the portion of the withdrawal that corresponds to the ATM withdrawal fee for a given transaction or, in another option, the ATM withdrawal fee may appear to the cardholder to have not been debited to the cardholder's checking account at all.

SUMMARY

This summary is not intended to represent each embodiment or every aspect; the following paragraphs of this summary provide representations of some embodiments as aspects thereof.

A debit-card withdrawal-fee payment method includes receiving selection of a first account to which withdrawal-fee payments are to be directed, receiving notification of a debit-card transaction withdrawal-fee amount associated with a second account, and making a withdrawal-fee payment to the first account in the withdrawal-fee amount.

A debit-card withdrawal-fee payment system includes an account servicing system and an automatic teller machine. The account servicing system is adapted to receive selection of a first account to which withdrawal-fee payments are to be directed and make a withdrawal-fee payment to the first account in a debit-card transaction withdrawal-fee amount associated with a second account. The automatic teller machine is interoperably coupled to the account servicing system and adapted to provide notification to the account servicing system of the debit-card transaction withdrawal-fee amount.

An article of manufacture for debit-card withdrawal-fee payments includes at least one computer readable medium and processor instructions contained on the at least one computer readable medium. The processor instructions contained on the at least one computer readable medium are configured to be readable from the at least one computer readable medium by at least one processor and thereby cause the at least one processor to operate as to receive selection of a first account to which withdrawal-fee payments are to be directed, receive notification of a debit-card transaction withdrawal-fee amount associated with a second account, and make a withdrawal-fee payment to the first account in the withdrawal-fee amount.

BRIEF DESCRIPTION OF THE DRAWINGS

A more complete understanding of the method and system as set forth herein may be obtained by reference to the following Detailed Description when taken in conjunction with the accompanying Drawings wherein:

FIG. 1 is a block diagram of a debit-card financial-processing network;

FIG. 2 is a diagram illustrating debit-card transactions and statement-cycle and customer-account activity; and FIG. 3 is a block diagram of an illustrative account servicing system.

DETAILED DESCRIPTION

Methods and systems will now be described more fully with reference to the accompanying drawings in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

FIG. 1 is a block diagram of a debit-card financial-processing network. A debit-card financial-processing network 100 includes an automatic teller machine (ATM) 102 interoperably connected to a debit-card processor 104. The debit-card processor 104 is interoperably connected an account servicing system 106. The account servicing system 106, which may be operated, for example, by FIDELITY, is interoperably connected to a cardholder account 108 at a bank or other financial institution, a cardholder investment account 110, and a customer rewards program 112. The customer rewards program 112 may, for example, be a rewards program administered by AFFINION LOYALTY GROUP (ALG).

In the typical operation of the debit-card financial-processing network 100, a customer seeks to withdraw funds from one of their accounts with their bank or other financial institution by using the ATM 102. The ATM 102 may be located in a variety of different locations, including other banks or financial institutions besides the bank or financial institution of the cardholder and retail point-of-sale locations such as, for example, a convenience store or gas station.

The debit-card processor 104 serves as an intermediary between the ATM 102 and the account servicing system 106. In a typical arrangement, the account servicing system 106 performs tasks related to the funds withdrawal by the customer at the ATM 102, such as authorizations and determinations whether adequate funds are present in the customer's account to make the funds withdrawal at the ATM 102. The debit-card processor 104 may, for example, be operated by MASTERCARD and take the form of a MASTERCARD DEBIT SWITCH (MDS). Of course, those having skill in the art will appreciate that this is not the only possible implementation of the debit-card processor 104 and that other implementations may be used without departing from the innovative principles described herein. The debit-card processor 104 may be part of an ATM network, such as, for example, those operated by STAR or PULSE.

As noted above, the account servicing system 106, in a typical embodiment, performs tasks associated with authorizing the transaction (e.g., withdrawal of funds) by the customer at the ATM 102. For example, the account servicing system 106 may check available funds in the customer's account and perform other necessary tasks to authorize the transaction. As part of the tasks performed by the account servicing system 106, the account servicing system 106 typically communicates with the cardholder account 108 at the cardholder's bank or other financial institution, for example, to verify that sufficient funds are available in the cardholder account 108 to complete the transaction at the ATM 102.

Following authorization of the transaction by the account servicing system 106, approval of the transaction is provided by the account servicing system 106 via the debit-card processor 104 to the ATM 102 and the requested funds are disbursed by the ATM 102 to the cardholder. In addition, the account servicing system communicates with the cardholder account 108 and appropriate debit(s) are made to the cardholder account 108 in light of the transaction at the ATM 102.

In a typical embodiment, when the ATM 102 is not provided by the bank or other financial institution of the cardholder using the ATM 102, the account servicing system 106 debits the cardholder account 108 both in the amount of funds withdrawn from the cardholder account 108 at the ATM 102 and also in an additional amount corresponding to a withdrawal fee charged to the cardholder for the privilege of using the ATM 102. As set forth above, a typical withdrawal fee charged at the ATM 102 ranges from $1.00-3.00. In a typical embodiment, the cardholder is required to agree to the withdrawal fee before proceeding with the transaction at the ATM 102.

One or more of the cardholder account 108, the cardholder investment account 110, and the customer rewards program 112 may be resident on the account servicing system 106 or may instead reside on a separate system from the account servicing system 106. For example, the cardholder's bank or other financial institution may outsource certain services to a third-party vendor, which outsourcing is typically transparent to the cardholder. As an example, the cardholder account 108 and the customer rewards program 112 may be resident on the account servicing system 106, the account servicing system 106 being administered by a third-party vendor with which the cardholder's bank or other financial institution contracts. As another example, the cardholder investment account 110 may reside on a separate system from the accounting servicing system 106.

Transaction codes are typically used by the account servicing system 106 for the funds withdrawn and also for the withdrawal fees. In this way, the actual funds withdrawn from the cardholder account at the ATM 102 and the withdrawal fees charged to use the ATM 102 can be easily distinguished from one another. In a typical embodiment, the debits to the cardholder account 108 remain in separate categories according to transaction code during a statement cycle and eventually post to the cardholder account 108 at the end of the statement cycle. For example, at the end of the statement cycle, the account servicing system 106 posts to the cardholder account 108 both the actual withdrawal debits as well as the withdrawal-fee debits corresponding to ATM transactions conducted by the cardholder during the statement cycle.

In some systems, withdrawal fees charged by ATMs, such as, for example, the ATM 102, are refunded by the cardholder's bank or other financial institution and are credited to a checking account of the cardholder at the cardholder's bank or other financial institution. For example, if the cardholder account 108 at the cardholder's bank or other financial institution is the cardholder's checking account, the cardholder account 108 could be credited in the amount of the withdrawal fee charged by the ATM 102. In this way, banks or other financial institutions that do not have their own ATMs can give their customers access to a wide range of ATMs without having to incur the costs of establishing and maintaining those ATMs themselves. Those having skill in the art will appreciate that, even though such withdrawal-fee refund programs may be marketed as free ATM programs, in reality, the customer's bank or other financial institution is in reality making a payment to the customer's checking account in an amount necessary to offset the withdrawal fees charged by the ATM 102 rather than obtaining a withdrawal-fee refund from the bank or other financial institution providing the ATM 102. Moreover, the customer's bank or other financial institution may, at its option, alter its withdrawal-fee program in many ways such as, for example, providing refunds in an amount different than the actual withdrawal fee charged by the ATM 102 or limiting the customer to certain ATMs based, for example, on geography or other factors.

In contrast to some systems, in various embodiments, the withdrawal fees charged to the cardholder resulting from ATM transactions may be directed to destinations other than the account from which the actual withdrawal and the withdrawal fee were debited. For example, if the cardholder account 108 is a checking account, the withdrawal fees for ATM transactions could be refunded to one or more of the cardholder investment account 110, the customer rewards program 112, or another account. The cardholder investment account 110 could, for example, be a money market account, a brokerage account, or a savings account.

In some embodiments, the customer may select in advance a particular account to which withdrawal-fee payments are to be directed. In other embodiments, the customer may select in advance certain conditions governing the destination of withdrawal-fee payments. For example, a customer may determine that payments at certain locations, in certain amounts, or for certain types of goods and services, are to be directed to different destinations. For instance, a customer may determine in advance that all withdrawal fees greater than $1.00 are to be directed to the cardholder investment account 110, while all withdrawal fees of $1.00 or less are to be directed to a particular charity. Those having skill in the art will appreciate that many different types of accounts may be used as the cardholder investment account 110 without departing from the innovative principles described herein. Moreover, the customer rewards program 112 may, for example, be such as that described in a U.S. patent application entitled METHODS AND SYSTEMS OF PROVIDING INVESTMENT REWARDS BASED ON PURCHASES, bearing Ser. No. 11/548,015.

FIG. 2 is a diagram demonstrating debit-card transactions and statement-cycle and customer-account activity. A diagram 200 illustrates two separate transactions, a transaction 202 and a transaction 204. Also illustrated in the diagram 200 are statement-cycle activity 206 and customer-account activity 208. In the transaction 202, the cardholder makes a debit-card withdrawal at an ATM located at a 7-11 convenience store. As indicated, the withdrawal is in the amount of $40.00 and a $1.50 withdrawal fee is also incurred, resulting in a total debit to the cardholder account 108 of $41.50. In similar fashion, the transaction 204, which occurs at an ATM at a SHELL gas station, results in a cash withdrawal from the cardholder account 108 in the amount of $20.00 and debiting of the cardholder account 108 in the amount of a $2.00 withdrawal fee. Thus, the transaction 204 results in the cardholder account 108 being debited in the amount of $22.00. The statement-cycle activity 206 illustrates that the 7-11 withdrawal fee of $1.50 and the SHELL withdrawal fee of $2.00 result in total ATM withdrawal fees of $3.50 to the cardholder account 108 for the applicable statement cycle, assuming that the transaction 202 and the transaction 204 are the only ATM transactions by the cardholder during the applicable statement cycle that results in a withdrawal fee.

The customer-account activity 208 assumes a $1,000 initial balance in the cardholder account 108. The transaction 202 and the transaction 204 are represented by a $41.50 debit and a $22.00 debit, respectively, resulting in a new balance in the cardholder account 108 of $936.50. In a typical embodiment, an amount equal to the $3.50 in total ATM withdrawal fees is credited to an account of the cardholder other than the cardholder account that was debited as a result of the ATM transactions. As noted above, the cardholder may select in advance the account or accounts to which the credit in the amount of the ATM withdrawal fees is to be directed. For example, the cardholder investment account 110 or the customer rewards program 112 may be credited. In another option, all or part of the total withdrawal fees may be directed to another account, such as for, for example, a charity designated by the cardholder. Thus, it will be apparent to those having skill in the art that the term account of the cardholder and the like do not necessarily mean an account in the name of the cardholder, but rather may also include accounts designated by the cardholder in advance to which all or part of refunds of withdrawal fees incurred by the cardholder may be directed.

FIG. 3 is a diagram illustrating an embodiment of an account servicing system (e.g., the account servicing system 106). In the implementation shown, a server 300 may include a bus 318 or other communication mechanism for communicating information and a processor 302 coupled to the bus 318 for processing information. The server 300 also includes a main memory 304, such as a random access memory (RAM) or other dynamic storage device, coupled to the bus 318 for storing computer readable instructions to be executed by the processor 302.

The main memory 304 also may be used for storing temporary variables or other intermediate information during execution of the instructions to be executed by the processor 302. The server 300 further includes a read only memory (ROM) 306 or other static storage device coupled to the bus 318 for storing static information and instructions for the processor 302. A computer readable storage device 308, such as a magnetic disk or optical disk, is coupled to the bus 318 for storing information and instructions for the processor 302.

The server 300 may be coupled via the bus 318 to a display 310, such as a cathode ray tube (CRT), for displaying information to a user. An input device 312, including, for example, alphanumeric and other keys, is coupled to the bus 318 for communicating information and command selections to the processor 302. Another type of user input device is a cursor control 314, such as a mouse, a trackball, or cursor direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer readable instructions" as used above refers to any instructions that may be performed by the processor 302 and/or other component of the server 300. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 308. Volatile media include dynamic memory, such as the main memory 304. Transmission media include coaxial cables, copper wire and fiber optics, including wires of the bus 318. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the server 300 can receive the data on the telephone line and use an infrared transmitter to convert the data to an infrared signal. An infrared detector coupled to the bus 318 can receive the data carried in the infrared signal and place the data on the bus 318. The bus 318 carries the data to the main memory 304, from which the processor 302 retrieves and executes the instructions. The instructions received by the main memory 304 may optionally be stored on the storage device 308 either before or after execution by the processor 302.

The server 300 may also include a communication interface 316 coupled to the bus 318. The communication interface 316 provides a two way data communication coupling between the server 300 and a network, such as the network 100. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

The storage device 308 can further include instructions for carrying out various processes for investment of debit-card withdrawal fees described herein when executed by the processor 302. The storage device 308 can further include a database for storing data related to debit-card withdrawal fees.

The previous description is of embodiment(s) for implementing the methods and systems described herein, and the scope should not be limited by this description. The scope is instead defined by the following claims.

What is claimed is:

1. A debit-card withdrawal-fee payment method comprising:
at a computer-implemented account servicing system, receiving a selection made by a cardholder of a principal account in name of the cardholder, a first destination account in name of the cardholder and a second destination account in name of the cardholder from a plurality of accounts in name of the cardholder, the second destination account selected based on at least an amount of an automatic teller machine (ATM) transaction and a location of the ATM transaction;
receiving a notification of a withdrawal-fee charge associated with the ATM transaction, the ATM transaction to debit the principal account in name of the cardholder in the transaction amount; and
performing at least one memory write operation at a processor associated with the computer-implemented account servicing system to credit either the first destination account in name of the cardholder or the second destination account in name of the cardholder based on the selection made by the cardholder, with at least a portion of the withdrawal-fee charge depending on the amount of the withdrawal-fee charge.

2. The debit-card withdrawal-fee payment method of claim 1, wherein the first destination account is a savings account and is to receive the portion of the withdrawal fee with the withdrawal fee being above a threshold, and wherein the second destination account is to receive the portion of the withdrawal fee with the withdrawal fee being below the threshold.

3. The debit-card withdrawal-fee payment method of claim 1, wherein the first destination account is an investment account and is to receive the portion of the withdrawal fee with the withdrawal fee being above a threshold, and wherein the second destination account is an account to receive the portion of the withdrawal fee with the withdrawal fee being below the threshold.

4. The debit-card withdrawal-fee payment method of claim 3, wherein the investment account comprises at least one of a money-market account or a brokerage account.

5. The debit-card withdrawal-fee payment method of claim 1, wherein the first destination account is associated with a customer rewards program.

6. The debit-card withdrawal-fee payment method of claim 1, wherein the first destination account and the principal account are the same account, wherein the second account is different than the first account.

7. A computer-implemented account servicing system comprising:
a communication interface to receive a selection made by a cardholder of a principal account in name of the cardholder, a first destination account in name of the cardholder and a second destination account in name of the cardholder from a plurality of accounts in name of the cardholder, the second destination account selected based on at least an amount of an automatic teller machine (ATM) transaction and a location of the ATM transaction, and a notification of a withdrawal-fee charge associated with the ATM transaction, the ATM transaction to debit the principal account in name of the cardholder in the transaction amount; and
a processor to credit, using the amount of the withdrawal-fee, one of the first destination account in name of the cardholder or the second destination account in name of the cardholder based on the selection made by the cardholder with at least a portion of the withdrawal-fee charge.

8. The computer-implemented account servicing system of claim 7, wherein the first destination account is a savings account, wherein the processor is to credit the first destination account if the withdrawal-fee charge is over a threshold and is to credit the second destination account otherwise.

9. The computer-implemented account servicing system of claim 7, wherein the first destination account is an investment account, and wherein the processor is to credit the investment account if the withdrawal-fee charge is over a threshold and is to credit the second destination account otherwise.

10. The computer-implemented account servicing system of claim 9, wherein the investment account comprises at least one of a money-market account or a brokerage account.

11. The computer-implemented account servicing system of claim 7, wherein at least one of the first destination account and the second destination account is associated with a customer rewards program.

12. The computer-implemented account servicing system of claim 7, wherein the first destination account is a checking account, and wherein the processor is to credit the checking account if the withdrawal-fee charge is over a threshold and is to credit the second destination account otherwise.

13. A non volatile computer readable storage medium having instructions stored thereon which, when executed by at least one processor, cause the processor to perform activities including:

- at a computer-implemented account servicing system, receiving a selection made by a cardholder of a principal account in name of the cardholder, a first destination account in name of the cardholder and a second destination account in name of the cardholder from a plurality of accounts in name of the cardholder, the second destination account selected based on at least an amount of an automatic teller machine (ATM) transaction and a location of the ATM transaction;
- receiving a notification of a withdrawal-fee charge associated with the ATM transaction, the ATM transaction to debit the principal account in name of the cardholder in the transaction amount; and
- crediting at least one of the first destination account in name of the cardholder and the second destination account in name of the cardholder based on the selection made by the cardholder, with at least a portion of the withdrawal-fee charge using the amount of the withdrawal-fee to determine which of the first destination account and the second destination account to credit.

14. The non volatile computer readable storage medium of claim 13, wherein the first destination account is a savings account.

15. The non volatile computer readable storage medium of claim 13, wherein the first destination account is an investment account.

16. The non volatile computer readable storage medium of claim 15, wherein the investment account comprises at least one of a money-market account or a brokerage account.

17. The non volatile computer readable storage medium of claim 13, wherein the first destination account is associated with a customer rewards program.

18. The non volatile computer readable storage medium of claim 13, wherein the first destination account is a checking account.

* * * * *